(12) United States Patent
Park et al.

(10) Patent No.: US 12,092,842 B2
(45) Date of Patent: *Sep. 17, 2024

(54) LENS MOVING APPARATUS

(71) Applicant: LG INNOTEK CO., LTD., Seoul (KR)

(72) Inventors: Sang Ok Park, Seoul (KR); Sang Jun Min, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/166,851

(22) Filed: Feb. 9, 2023

(65) Prior Publication Data

US 2023/0185104 A1    Jun. 15, 2023

Related U.S. Application Data

(63) Continuation of application No. 16/921,404, filed on Jul. 6, 2020, now Pat. No. 11,604,365, which is a (Continued)

(30) Foreign Application Priority Data

Dec. 30, 2014 (KR) .......................... 10-2014-0193764
Jan. 12, 2015 (KR) .......................... 10-2015-0004071

(51) Int. Cl.
*G02B 27/64* (2006.01)
*G02B 7/08* (2021.01)
(Continued)

(52) U.S. Cl.
CPC ............. *G02B 27/646* (2013.01); *G02B 7/08* (2013.01); *H04N 23/54* (2023.01); *H04N 23/55* (2023.01)

(58) Field of Classification Search
CPC ...... G02B 27/646; G02B 7/08; H04N 5/2253; H04N 5/2254
See application file for complete search history.

(56) References Cited

U.S. PATENT DOCUMENTS 7,227,285 B2   6/2007   Osaka
10,175,498 B2  1/2019   Park et al.
(Continued)

FOREIGN PATENT DOCUMENTS

CN   1890591 A    1/2007
CN   100335936 C  9/2007
(Continued)

OTHER PUBLICATIONS

European Search Report dated May 27, 2016 in European Application No. 15200746.4.
(Continued)

*Primary Examiner* — Cara E Rakowski
(74) *Attorney, Agent, or Firm* — Saliwanchik, Lloyd & Eisenschenk

(57) ABSTRACT

A lens moving apparatus includes a bobbin adapted to move upward and downward in a first direction, a housing in which the bobbin is accommodated and which is movable upward and downward in the first direction, a cover member accommodating the bobbin and the housing, and a base to which a lower portion of the cover member is coupled, wherein the cover member has an opening formed in an upper face thereof, and is provided at an area thereof surrounding the opening with a first stopper for limiting a distance by which the bobbin moves upward.

6 Claims, 14 Drawing Sheets

Related U.S. Application Data continuation of application No. 16/204,199, filed on Nov. 29, 2018, now Pat. No. 10,739,610, which is a continuation of application No. 14/983,698, filed on Dec. 30, 2015, now Pat. No. 10,175,498.

(51) Int. Cl.
*H04N 23/54* (2023.01)
*H04N 23/55* (2023.01)

(56) References Cited

U.S. PATENT DOCUMENTS

| | | |
|---|---|---|
| 2006/0202566 A1 | 9/2006 | Osaka |
| 2007/0047942 A1 | 3/2007 | Chang et al. |
| 2007/0154198 A1 | 7/2007 | Oh et al. |
| 2009/0128637 A1 | 5/2009 | Noji |
| 2009/0128937 A1 | 5/2009 | Sano |
| 2010/0060994 A1 | 3/2010 | Akabane et al. |
| 2011/0163616 A1 | 7/2011 | Kwon |
| 2011/0291495 A1 | 12/2011 | Lee et al. |
| 2012/0026611 A1 | 2/2012 | Hu et al. |
| 2012/0218635 A1 | 8/2012 | Suzuka |
| 2013/0099600 A1 | 4/2013 | Park |
| 2013/0170055 A1 | 7/2013 | Yu |
| 2013/0194490 A1 | 8/2013 | Okuyama et al. |
| 2014/0177056 A1 | 6/2014 | Hayashi et al. |
| 2014/0355120 A1 | 12/2014 | Yeo |
| 2015/0195438 A1 | 7/2015 | Park |
| 2015/0253583 A1 | 9/2015 | Cho |
| 2015/0323758 A1 | 11/2015 | Lee et al. |
| 2016/0018667 A1 | 1/2016 | Yeo |
| 2017/0017056 A1 | 1/2017 | Park et al. |
| 2017/0115463 A1* | 4/2017 | Osaka .................... H02K 41/02 |
| 2017/0192195 A1 | 7/2017 | Murakami |
| 2017/0371127 A1 | 12/2017 | Murakami |

FOREIGN PATENT DOCUMENTS

| | | |
|---|---|---|
| CN | 101526658 A | 9/2009 |
| CN | 101676788 A | 3/2010 |
| CN | 101819313 A | 9/2010 |
| CN | 101878443 A | 11/2010 |
| CN | 101893803 A | 11/2010 |
| CN | 102043222 A | 5/2011 |
| CN | 102263472 A | 11/2011 |
| CN | 102472944 A | 5/2012 |
| CN | 102879972 A | 1/2013 |
| CN | 103792758 A | 5/2014 |
| CN | 103901701 A | 7/2014 |
| CN | 104081272 A | 10/2014 |
| CN | 104204934 A | 12/2014 |
| CN | 104216199 A | 12/2014 |
| JP | 2012-211994 A | 11/2012 |
| KR | 10-2012-0090382 A | 8/2012 |
| KR | 10-2013-0026726 A | 3/2013 |
| KR | 10-1340608 B1 | 12/2013 |
| KR | 10-2014-0059329 A | 5/2014 |
| KR | 10-1440807 B1 | 9/2014 |
| KR | 10-2016-0001577 A | 1/2016 |
| WO | 2008/072892 A1 | 6/2008 |
| WO | 2013/183270 A1 | 12/2013 |

OTHER PUBLICATIONS

Office Action dated Aug. 15, 2017 in U.S. Appl. No. 14/983,698.
Office Action dated Jul. 2, 2019 in Chinese Application No. 201511000775.X.
Office Action dated Dec. 13, 2019 in U.S. Appl. No. 16/204,199.
Notice of Allowance dated Apr. 6, 2020 in U.S. Appl. No. 16/204,199.
Office Action dated May 14, 2021 in Korean Application No. 10-2014-0193764.
Office Action dated Jun. 15, 2021 in Korean Application No. 10-2015-0004071.
Office Action dated Nov. 15, 2021 in Chinese Application No. 202010825806.X.
Office Action dated Nov. 22, 2021 in Chinese Application No. 202010826660.0.
Office Action dated Dec. 15, 2021 in U.S. Appl. No. 16/921,404.
Office Action dated Mar. 28, 2022 in U.S. Appl. No. 16/921,404.
Office Action dated Aug. 30, 2022 in U.S. Appl. No. 16/921,404.
Notice of Allowance dated Nov. 9, 2022 in U.S. Appl. No. 16/921,404.

* cited by examiner

1800

1800

LENS MOVING APPARATUS

CROSS-REFERENCE TO RELATED APPLICATIONS

This application is a continuation of U.S. application Ser. No. 16/921,404, filed Jul. 6, 2020; which is a continuation of U.S. application Ser. No. 16/204,199, filed Nov. 29, 2018, now U.S. Pat. No. 10,739,610, issued Aug. 11, 2020; which is a continuation of U.S. application Ser. No. 14/983,698, filed Dec. 30, 2015, now U.S. Pat. No. 10,175,498, issued Jan. 8, 2019; which claims the benefit under 35 U.S.C. § 119 to Korean Patent Application Nos. 10-2014-0193764, filed Dec. 30, 2014; and 10-2015-0004071, filed Jan. 12, 2015; which are all hereby incorporated by reference in their entirety.

TECHNICAL FIELD

Embodiments relate to a lens moving apparatus.

BACKGROUND

It is difficult to adopt voice coil motor (VCM) technology, which is typically used in conventional camera modules, for use in an ultracompact camera module, which aims at achieving low power consumption, and thus research into the technology has been actively undertaken.

A camera module mounted in a small-sized electronic product, such as a smart phone, may incorporate an autofocusing function of automatically finding the optimal focus of a lens with respect to an object.

In addition, the camera module may minutely shake due to the trembling of the user's hand while taking a photograph. Therefore, there is a high necessity for a technology capable of incorporating a handshake correction function into the camera module.

In order to fulfill the autofocusing and handshake correction functions of a lens, the camera module may incorporate a lens moving apparatus for moving a lens provided in the camera module upward and downward in the first direction and in the second and/or third direction, which are perpendicular to the first direction.

When a lens barrel in which one or multiple lenses constitute the optical system is moved in the first, second or third direction by a lens moving apparatus, the components provided in the camera module may collide with each other, and the components may be damaged or broken due to the collision.

For the purpose of precise and efficient autofocusing and handshake correction, there is a necessity to appropriately limit the distance by which a lens or a lens barrel moves in the first, second or third direction.

A conventional IT product incorporating an ultracompact digital camera is provided therein with a lens moving apparatus for fulfilling an autofocusing function of controlling the focal length of a lens by adjusting the distance between the lens and an image sensor for converting external light into a digital image or a digital video.

Autofocusing may be implemented in such a way as to measure a displacement value in the optical axis direction, that is, in the first direction, by means of a unit for detecting displacement in the optical axis direction, which is provided in the lens moving apparatus, and adjust the distance between the image sensor and the lens by means of a controller based on the measured displacement value.

Accordingly, there is a high necessity for a lens moving apparatus having a configuration capable of measuring a displacement value in the first direction and a camera module including the lens moving apparatus.

BRIEF SUMMARY

Accordingly, an object of the embodiments is to provide a lens moving apparatus capable of appropriately limiting the distance by which a lens or a lens barrel moves in the first, second or third direction.

Another object of the embodiments is to provide a lens moving apparatus having a configuration capable of accurately measuring a displacement value in the first direction.

In one embodiment, a lens moving apparatus includes a bobbin adapted to move upward and downward in a first direction, a housing in which the bobbin is accommodated and which is movable upward and downward in the first direction, a cover member accommodating the bobbin and the housing, and a base to which a lower portion of the cover member is coupled, wherein the cover member has an opening formed in an upper face thereof, and is provided at an area thereof surrounding the opening with a first stopper for limiting a distance by which the bobbin moves upward.

In another embodiment, a lens moving apparatus includes a bobbin adapted to move upward and downward in a first direction, a housing in which the bobbin is accommodated and is movable upward and downward in the first direction, a cover member accommodating the bobbin and the housing, and a base to which a lower portion of the cover member is coupled, wherein the bobbin includes a fifth stopper, which protrudes downward from a lower portion of the bobbin to limit a distance by which the bobbin moves downward in a second or third direction.

In a further embodiment, a lens moving apparatus includes a first magnet, a housing on which the first magnet is mounted, a bobbin on an outer surface of which a coil is wound, a second magnet mounted on the bobbin, and a position detection sensor disposed to face the second magnet, wherein the coil includes a plurality of coils, which are wound around a plurality of areas of an outer surface of the bobbin and are spaced apart from each other in the first direction, and the position detection sensor is disposed at at least a portion thereof between the plurality of coils.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
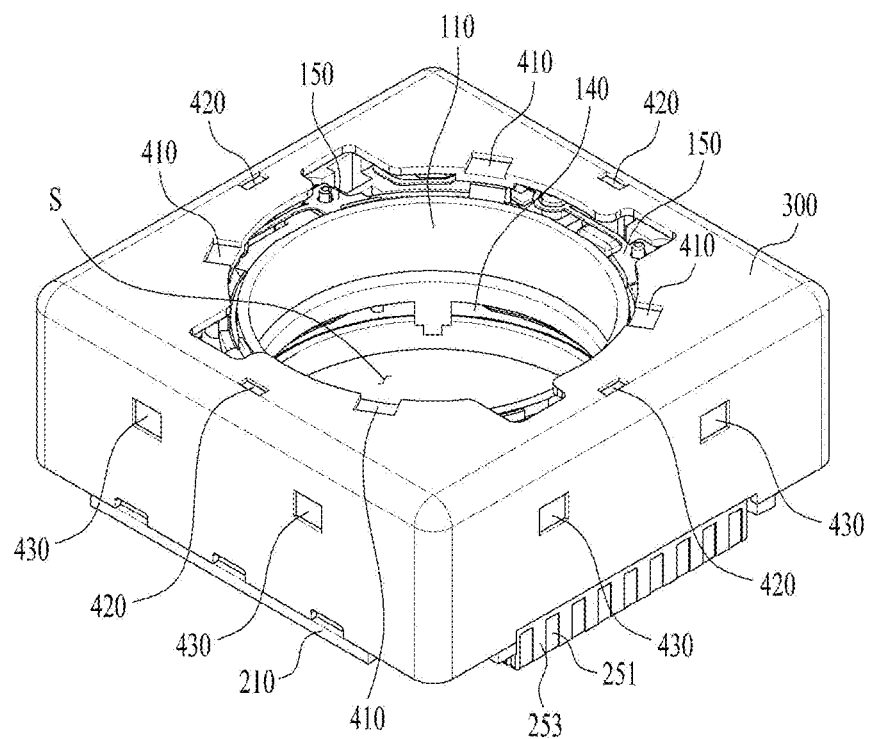
FIG. 1 is a perspective view showing a lens moving apparatus according to an embodiment of the present invention.

Hereinafter, embodiments will be described with reference to the attached drawings. In the drawings, the same or similar elements are denoted by the same reference numerals even when they are depicted in different drawings. In the following description, a detailed description of known functions and configurations incorporated herein will be omitted when it may make the subject matter of the disclosure rather unclear. Those skilled in the art will appreciate that some features in the drawings are exaggerated, reduced, or simplified for ease in description, and drawings and elements thereof are not shown always at the proper proportion.

For reference, in the respective drawings, a rectangular coordinate system (x, y, z) may be used. In the drawings, the x-axis and the y-axis mean a plane perpendicular to an optical axis and, for convenience, an optical axis (z-axis) direction may be referred to as a first direction, an x-axis direction may be referred to as a second direction, and a y-axis direction may be referred to as a third direction.

Figure 2:
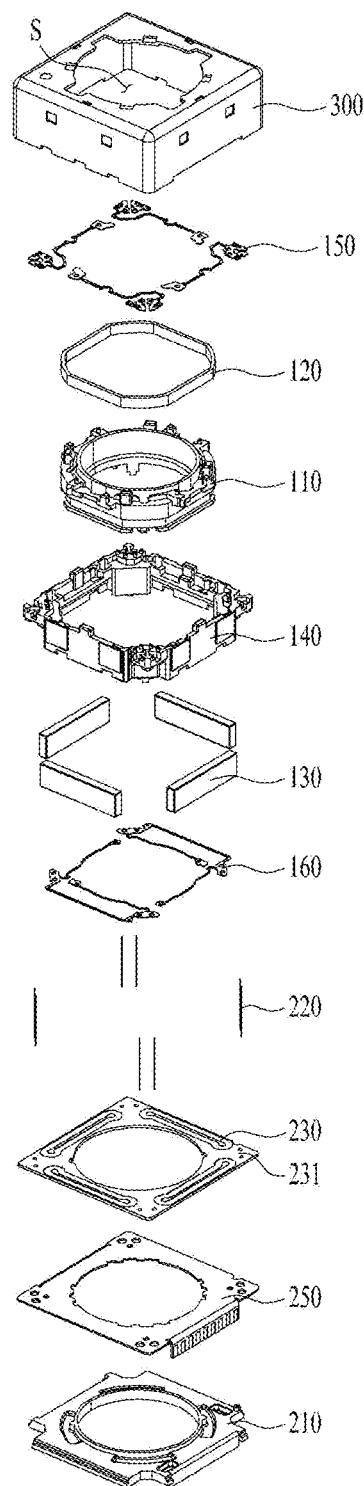
FIG. 2 is an exploded perspective view showing the lens moving apparatus according to the embodiment.

FIG. 1 is a perspective view showing a lens moving apparatus according to an embodiment of the present invention. FIG. 2 is an exploded perspective view showing the lens moving apparatus according to the embodiment.

An handshake correction apparatus, which is applied to compact camera modules of mobile devices such as smart phones or tablet PCs, refers to an apparatus configured to inhibit the contour of an image, captured when taking a still image, from being unclearly formed due to vibrations caused by the trembling of the user's hand.

In addition, an autofocusing apparatus is configured to automatically focus the subject image on the surface of an image sensor (not shown). The handshake correction apparatus and the autofocusing apparatus may be configured in various manners. In the embodiments, the lens moving apparatus may perform the handshake correction and/or autofocusing operations in such a manner as to move an optical module, composed of a plurality of lenses, in a first direction or in a plane perpendicular to the first direction.

As shown in FIGS. 1 and 2, the lens moving apparatus according to an embodiment may include a movable unit. The movable unit may fulfill the functions of autofocusing and handshake correction for a lens. The movable unit may include a bobbin 110, a first coil 120, first magnets 130, a housing 140, an upper elastic member 150 and a lower elastic member 160.

The bobbin 110 may be accommodated in the housing 140. The first coil 120, which is disposed in the first magnets 130, may be provided on the outer surface of the bobbin 110. The bobbin 110 may be mounted so as to be reciprocated in a first direction in the internal space of the housing 140 by electromagnetic interaction between the first magnets 130 and the first coil 120. The first coil 120 may be provided on the outer surface of the bobbin 110 so as to electromagnetically interact with the first magnets 130.

The bobbin 110 may be moved in the first direction while being elastically supported by the upper and lower elastic members 150 and 160, thereby fulfilling the autofocusing function.

The bobbin 110 may include a lens barrel (not shown) into which at least one lens is mounted. The lens barrel may be internally coupled to the bobbin 110 in various manners.

In an example, the bobbin 110 may be provided on the inner surface thereof with a female threaded portion, and the lens barrel may be provided on the outer surface thereof with a male threaded portion corresponding to the female threaded portion, whereby the lens barrel may be coupled to the bobbin 110 by means of threaded engagement therebetween. However, the coupling between the lens barrel and the bobbin 110 is not limited thereto, and the lens barrel may be directly coupled to the inside of the bobbin 110 in a way other than the threaded engagement, without providing the female threaded portion on the inner surface of the bobbin 110. Alternatively, one or more lenses may be integrally formed with the bobbin 110 without using the lens barrel.

The lens, which is coupled to the lens barrel, may be composed of a single lens, or two or more lenses constituting an optical system.

The autofocusing function may be controlled by changing the direction of current, or may be fulfilled by the action of moving the bobbin 110 in the first direction. For example, the bobbin 110 may be moved upward from its initial position upon the application of forward current, and may be moved downward upon the application of reverse current. The distance by which the bobbin 110 moves in one direction from the initial position may be increased or decreased by controlling the amount of current flowing in one direction.

The bobbin 110 may be provided on upper and lower surfaces thereof with a plurality of upper support protrusions and a plurality of lower support protrusions, respectively. The upper support protrusions may be configured to have a circular cylindrical shape or a rectangular column shape, and may serve to couple or secure the upper elastic member 150 thereto. The lower support protrusions may also be configured to have a circular cylindrical shape or a rectangular column shape, and may serve to couple or secure the lower elastic member 160 thereto, like the upper support protrusions.

The upper elastic member 150 may have through holes corresponding to the upper support protrusions, and the lower elastic member 160 may have through holes corresponding to the lower support protrusions. The respective support protrusions and the corresponding through holes may be fixedly coupled to each other by means of thermal fusion or an adhesive such as epoxy.

The housing 140 may be configured to have a hollow column, for example, an approximately rectangular hollow column capable of supporting the first magnets 130. Each lateral side of the housing 140 may be provided with the first magnet 130 and support members 220 secured thereto. As described above, the bobbin 110 may be disposed on the inner surface of the housing 140, and may be guided and moved in the first direction by the housing 140.

Each of the upper and lower elastic members 150 and 160 may be coupled to both the housing 140 and the bobbin 110, and the upper elastic member 150 and the lower elastic member 160 may elastically support the upward or downward movement of the bobbin 110 in the first direction. The upper elastic member 150 and the lower elastic member 160 may be constituted by a leaf spring.

As shown in FIG. 2, the upper elastic member 150 may be composed of a plurality of elastic members, which are separated from each other. By virtue of the multiple partitioning structure, current having different polarities or different electric powers may be applied to the respective elastic members of the upper elastic member 150. The lower elastic member 160 may also be composed of a plurality of elastic members, and may be conductively connected to the upper elastic member 150.

The upper elastic member 150, the lower elastic member 160, the bobbin 110 and the housing 140 may be assembled to one another by means of thermal fusion and/or bonding using an adhesive or the like.

The base 210 may be disposed under the bobbin 110, and may be configured to have an approximately rectangular shape. A printed circuit board 250 may be mounted on the base 210.

The regions of the base 210 that face terminal members 253 of the printed circuit board 250 may be provided with respective support recesses having a size corresponding to that of the terminal members 253. The support recesses may be recessed from the outer circumferential surfaces of the base 210 by a predetermined depth such that the terminal members 253 do not protrude outward from the outer circumferential surface of the base 210 or such that the extent to which the terminal members 253 protrude can be controlled.

The support members 220 are disposed on the lateral sides of the housing 140 such that the upper sides of the support members 220 are coupled to the housing 140 and the lower sides of the support members 220 are coupled to the base 210. The support members 220 may support the bobbin 110 and the housing 140 in such a manner as to allow the bobbin 110 and the housing 140 to move in the second and third directions, perpendicular to the first direction. The support members 220 may be conductively connected to the first coil 120.

Since the support members 220 according to the embodiment are disposed one on the outer surface of each corner of the housing 140, a total of four support members 220 may be disposed. The support members 220 may be conductively connected to the upper elastic member 150. Specifically, the support members 220 may be conductively connected to regions around the through holes.

Since the support members 220 are made of a material different from that of the upper elastic member 150, the support members 220 may be conductively connected to the upper elastic member 150 by means of a conductive adhesive, solder or the like. Consequently, the upper elastic member 150 may apply current to the first coil 120 through the support members 220 conductively connected thereto.

The support members 220 may be connected to the printed circuit board 250 through the through holes formed in the circuit member 231 and the printed circuit board 250. Alternatively, in place of forming the through holes in the circuit member 231 or the printed circuit board 250, the support members 220 may be conductively soldered to the area of the circuit member 231 at which the through hole would be formed.

Although the support members 220 are illustrated in FIG. 2 as being embodied as linear support members according to an embodiment, the support members 220 are not limited thereto. In other words, the support members 220 may be configured to have a plate shape or the like.

Second coils 230 may move the housing 140 in the second and/or third directions to perform the handshake correction by virtue of electromagnetic interaction with the first magnets 130.

The second or third direction may include not only the x-axis direction or the y-axis direction but also a direction which is substantially close to the x-axis direction or the y-axis direction. In other words, in terms of driving in the embodiments, although a housing 140 may move in a direction parallel to the x-axis or the y-axis, the housing may move in a direction which is slightly inclined with respect to the x-axis or the y-axis in the state of being supported by a support member 220.

Accordingly, the first magnets 130 are required to be disposed at positions corresponding to the second coils 230.

The second coils 230 may be disposed so as to face the first magnets 130, which are secured to the housing 140. In one embodiment, the second coils 230 may be disposed outside the first magnets 130, or may be disposed under the first magnets 130 so as to be spaced apart from the first magnets 130 by a predetermined distance.

Although a total of four second coils 230 may be disposed one on each side of a circuit member 231 according to the embodiment, the disclosure is not limited thereto. Only two second coils 230, that is, one second coil for movement in the second direction and one second coil for movement in the third direction, may be provided, or a total of more than four second coils 230 may be provided.

In the embodiment, although circuit patterns having the shape of the second coils 230 are formed on the circuit member 231 and additional second coils are disposed on the circuit member 231, the disclosure is not limited thereto. Alternatively, only additional second coils 230 may be disposed on the circuit member 231, without forming the circuit patterns having the shape of the second coils 230.

Furthermore, the second coils 230, which have been prepared by winding wires into a doughnut shape or which have the shape of a finely patterned coil, may be conductively connected to the printed circuit board 250.

The circuit member 231 including the second coils 230 may be disposed on the upper surface of the printed circuit board 250, which is positioned over the base 210. However, the disclosure is not limited thereto, and the second coils 230 may be disposed on the base 210 in a state of being in close contact therewith, or may be spaced apart from the base 210 by a predetermined distance. In other examples, a substrate on which the second coils are formed may be layered on the printed circuit board 250 and connected thereto.

The printed circuit board 250 may be conductively connected to at least one of the upper elastic member 150 and the lower elastic member 160, and may be coupled to the upper surface of the base 210. As shown in FIG. 2, the printed circuit board 250 may have through holes formed at positions corresponding to the support members 220, so as to allow the support members 220 to be fitted into the through holes.

The printed circuit board 250 may be provided with the terminal members 253, which are formed by bending portions of the printed circuit board 250. Each terminal member 253 includes a plurality of terminals 251 for the application of external power to the terminal members 253, whereby current is supplied to the first coil 120 and the second coils 230. The number of terminals 251 provided on each terminal member 253 may be increased or decreased depending on the kinds of components to be controlled. Alternatively, the number of terminal members 253 provided on the printed circuit board may be one, or three or more.

A cover member 300, which is configured to have an approximate box shape, may accommodate the movable unit, the second coils 230 and a portion of the printed circuit board 250, and may be coupled to the base 210. The cover member 300 may serve to protect the movable unit, the second coils 230, the printed circuit board 250 and the like, accommodated therein, from damage, and may serve to inhibit an electromagnetic field, which is generated by the first magnets 130, the first coil 120, the second coils 230 and the like, from leaking outward, thereby concentrating the electromagnetic field.

Figure 3:
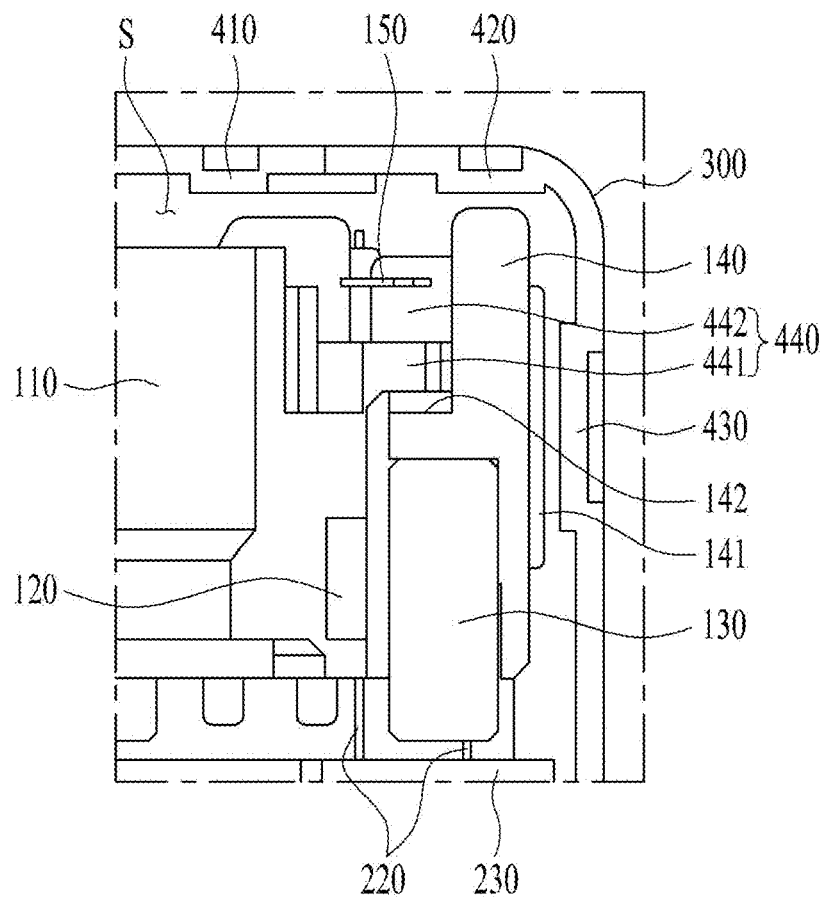
FIG. 3 is a cross-sectional view showing part of the lens moving apparatus according to the embodiment.

FIG. 1 is a perspective view showing the lens moving apparatus according to an embodiment. FIG. 3 is a cross-sectional view showing part of the lens moving apparatus according to the embodiment.

The lens moving apparatus according to the embodiment may include a first stopper 410. As shown in FIGS. 1 and 3, the first stoppers 410 may be formed on the cover member 300 in the first direction.

Specifically, the cover member 300 may be configured to have a box shape having an opening S formed in the upper wall thereof. The first stoppers 410 may be positioned around the periphery of the opening S over the bobbin 110, and may limit the distance by which the bobbin 110 can move upward.

The first stoppers 410 may include a plurality of stoppers, which are circumferentially disposed around the periphery of the opening S at regular intervals. Here, the first stoppers 410 may be symmetrically disposed around the opening S.

In order to limit the distance by which the bobbin 110 can be moved upward while keeping the bobbin 110 in the state of not being inclined in the second or third direction, perpendicular to the first direction, the first stoppers 410 may be preferably disposed in a symmetrical arrangement, as described above.

The first stoppers 410 may be formed by depressing the outer surface of the upper wall of the cover member 300 to thus make the inner surface of the upper wall protrude. Alternatively, the first stoppers 410, having this configuration, may be formed by injection molding, rolling or the like.

The first stoppers 410 may limit the distance by which the bobbin 110 can move upward in the first direction. If the bobbin 110 moves upward too far, it is difficult to easily and efficiently control the distance that the bobbin 110 moves upward, and the upper elastic member 150 and the lower elastic member 160 may be excessively deformed due to the excessive displacement of the bobbin 110.

Accordingly, in order to inhibit the drive characteristics and the reliability of products from being deteriorated for that reason, the distance by which the bobbin 110 moves upward may be appropriately restricted by providing the first stoppers 410 to the cover member 300.

The distance by which the bobbin 110 moves upward may be appropriately restricted by contact between the lower ends of the first stoppers 410 and the upper end of the bobbin 110. By appropriately setting the distance by which the first stoppers 410 protrude downward in the first direction and the shape and height of the region of the bobbin 110 that contacts the first stoppers 410, the distance by which the bobbin 110 moves upward may be appropriately restricted by the first stoppers 410.

The lens moving apparatus according to the embodiment may include second stoppers 420. As shown in FIGS. 1 and 3, the second stopper 420 may be formed on the cover member 300. Specifically, the second stoppers 420 may be formed near respective sides of the upper wall of the cover member 300.

The second stoppers 420 may be disposed to face the upper end of the housing 140 so as to limit the distance by which the housing 140 moves upward. The second stoppers 420 may include a plurality of stoppers, which are symmetrically disposed around the opening S.

In order to limit the distance by which the housing 140 can move upward while keeping the housing 140 in the state of not being inclined in the second or third direction, perpendicular to the first direction, the second stoppers 420 may be preferably disposed in the symmetrical arrangement described above.

The second stoppers 420 may be formed by depressing the outer surface of the upper wall of the cover member 300 downward to thus cause the inner surface of the upper wall to protrude downward. The second stoppers 420 having this configuration may be formed by injection molding, rolling or the like.

The second stoppers 420 may limit the distance by which the housing 140 moves upward in the first direction. Unlike the bobbin 110, the housing 140 may not actively move upward and downward in the first direction.

However, when the lens moving apparatus performs the handshake correction operation, the housing 140 may be inclined in the second or third direction, whereby the housing may move upward in the first direction.

As the housing 140 moves upward, the support members 220 may be extended in the length direction by being subjected to the tensile force or bending moment. Accordingly, when the excessive upward movement of the housing 140 is repeated, the support members 220 are extended so far that the deformation of the support members 220 exceeds the limit of elasticity, whereby the support members 220 may be damaged, even breaking in severe cases.

Accordingly, in order to inhibit damage, breakage or the like of the support members 220, there is a need to limit the upward movement of the housing 140. The second stoppers 420 may limit the distance by which the housing 140 moves upward in order to inhibit damage, breakage or the like of the support members 220.

By virtue of the limitation of the distance by the housing 140 moves upward, there is an effect of being able to easily control the resonance frequency when mechanical resonance is generated from the support members 220.

The distance by which the housing 140 moves upward may be limited by contact between the lower end and upper end of the second stoppers 420. By appropriately setting the distance by which the second stoppers 420 protrude downward in the first direction and the shape and height of the region of the housing 140 that contacts the second stoppers 420, the distance by which the housing 140 moves upward may be appropriately restricted by the second stoppers 420.

The lens moving apparatus according to the embodiment may include third stoppers 430. As shown in FIGS. 1 and 3, the third stoppers 430 may be formed on the cover member 300. Specifically, the third stoppers 430 may be formed on the side walls of the cover member 300 so as to limit the distance by which the housing 140 can move in the second or third direction.

Since the bobbin 110 may be supported by the housing 140 and may move in the second or third direction together with the housing 140, the third stoppers 430 may limit the distance by which the housing 140 moves in the second or third direction, and may thus limit the distance by which the bobbin 110 moves in the second or third direction.

The third stoppers 430 may be disposed to face the side surfaces of the housing 140 so as to serve to limit the distance by which the housing 140 moves in the second or third direction. The third stoppers 430 may include a plurality of stoppers, which are symmetrically disposed around the opening S.

In order to allow the housing 140 to move in the second or third direction and make the distances that the housing moves 140 in the second and third directions uniform while the lens moving apparatus performs the handshake correction operation, the third stoppers 430 may be preferably disposed in the symmetrical fashion described above.

The third stoppers 430 may be formed by depressing the outer surfaces of the side walls of the cover member 300 inward and causing the inner surfaces of the side walls to protrude inward. Alternatively, the third stoppers 430 having this configuration may be formed by injection molding, rolling or the like.

The third stoppers 430 may be formed on planar parts of the side walls of the cover member 300. In order to realize a structure that allows the third stoppers 430 to be easily formed and allows the outer surfaces of the housing 140 to contact the third stoppers 430 while inhibiting the outer surfaces of the housing 140 and the third stoppers 430 from interfering with other components or structures, it may be preferable that the third stoppers 430 be formed on the planar parts of the side walls of the cover member 300.

In one embodiment, the third stoppers 430 may be disposed to face first protrusions 141 formed on side surfaces of the housing 140. In the embodiment, since a total of eight first protrusions 141 are formed two on each planar part of the outer surfaces of the housing 140, a total of eight third stoppers 430 may also be formed two on each planar part of the side walls of the cover member 300.

Since the third stoppers 430 are positioned to correspond to the first protrusions 141, the third stoppers 430 may be formed on the cover member 300 in a number and at positions corresponding to the number and positions of the first protrusions 141.

When the third stoppers 430 are disposed at positions corresponding to the first protrusions 141, it is possible to reduce the depth of the third stoppers 430, and the first protrusions 141 may alleviate impacts and vibrations applied to the housing 140 upon collision between the first protrusions 141 and the third stoppers 430.

However, the disposition of the third stoppers 430 is not limited thereto. For example, the third stoppers 430 may be disposed so as to contact portions of the outer surface of the housing 140 at which the first protrusions 141 are not formed.

During the handshake correction operation of the lens moving apparatus, the housing 140 may move in the second or third direction, and the support members 220 may be extended in the length direction thereof by being subjected to a tensile force or bending moment caused by the movement of the housing 140.

When the excessive movement of the housing 140 in the second or third direction is repeated, the support members 220 are extended so far that the deformation of the support members 220 exceeds the elastic limit, whereby the support members 220 may be damaged and may be broken due to fatigue.

Accordingly, in order to inhibit damage, breakage or the like of the support members 220, there is a need to limit the movement of the housing 140 in the second and third directions. The third stoppers 430 may limit the distance that the housing 140 moves in the second or third direction in order to suppress damage, breakage or the like of the support members 220. In addition, by virtue of the limitation of the distance by which the housing 140 moves in the second or third direction, there is an effect of being able to easily control a resonance frequency when mechanical resonance is generated from the support members 220.

The distance by which the housing 140 moves in the second or third direction may be appropriately limited by contact between the outer surface of the housing 140 or the first protrusions 141 and the third stoppers 430.

By appropriately setting the distance that the third stoppers 430 protrude inward from the cover member 300 and the shape and protruding height of the outer surface of the housing 140 or the first protrusions 141, which contact the third stoppers 430, the distance by which the housing 140 moves in the second or third direction may be appropriately restricted by the third stoppers 430.

Figure 4:
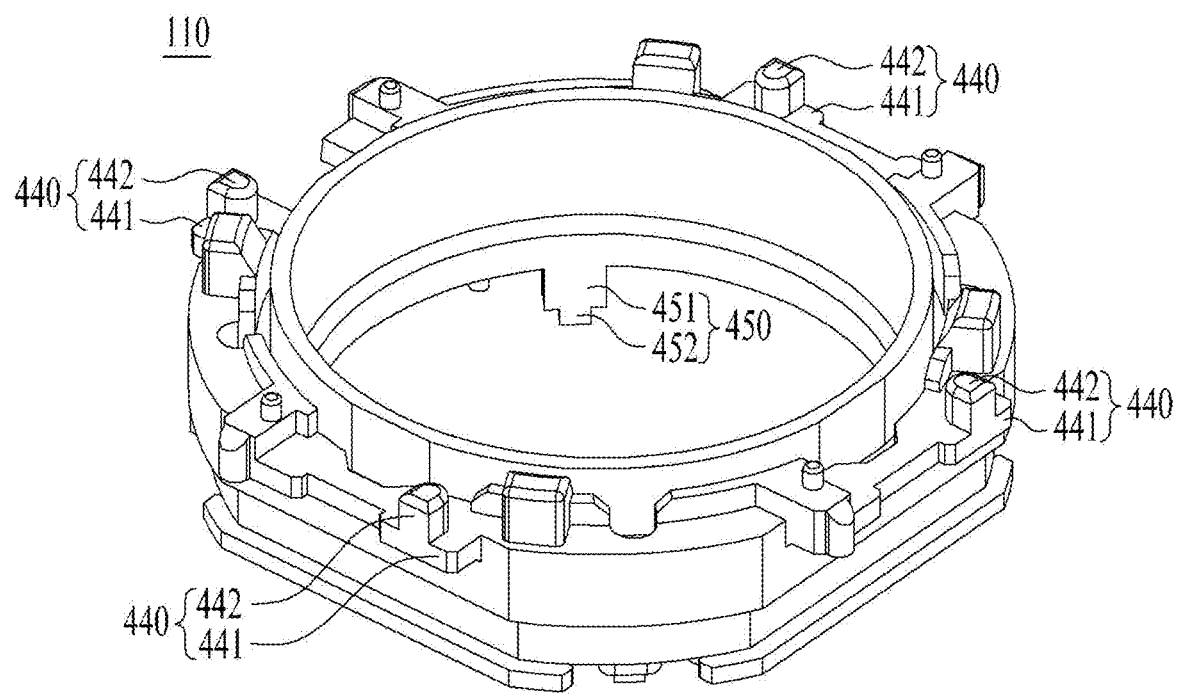
FIG. 4 is a perspective view showing a bobbin according to an embodiment.

FIG. 3 is a cross-sectional view showing part of the lens moving apparatus according to an embodiment. FIG. 4 is a perspective view showing the bobbin 110 according to an embodiment.

The lens moving apparatus according to the embodiment may include fourth stoppers 440.

As shown in FIGS. 3 and 4, the fourth stoppers 440 may be formed on the bobbin 110. Specifically, the fourth stoppers 440 protrude from the outer surface of the bobbin 110 so as to limit the distance that the bobbin 110 can move downward. Each of the fourth stoppers 440 may include a second protrusion 441 and a third protrusion 442.

The second protrusion 441 may be disposed such that the lower surface thereof faces a first stepped portion 142, which is formed on the housing 140 so as to limit the distance by which the bobbin 110 moves downward. Accordingly, when the bobbin 110 moves downward in the first direction, the bobbin 110 may move downward by the distance between the second protrusion 441 and the first stepped portion 142 of the bobbin 110.

The third protrusion 442 protrudes upward from the second protrusion 441 and contacts part of the inner surface of the housing 140, thereby functioning to guide the movement of the bobbin 110 in the first direction together with the housing 140.

The second protrusions 441 may contact at least part of the inner surface of the housing 140 so as to guide the movement of the bobbin 110 in the first direction. In other words, the second protrusions 441 and the third protrusions 442 may collectively function to guide the movement of the bobbin 110 in the first direction.

The second protrusion 441 may be configured to have a larger surface area than the third protrusion 442 when viewed in the first direction. The second protrusion 441 may function to limit the distance by which the bobbin 110 moves downward and guide the movement of the bobbin 110 in the first direction.

Accordingly, unlike the third protrusion 442, the second protrusion 441 may contact the housing 140 at the lower surface and side surface thereof. Accordingly, it may be preferable for the second protrusion 441 to be designed to have a larger surface area than the third protrusion 442 so as to resist impact and abrasion caused by the housing 140.

The fourth stoppers 440 may include a plurality of stoppers, and may be symmetrically disposed around the center of the bobbin 110. In order to limit the distance by which the bobbin 110 can move downward while keeping the bobbin 110 in the state of not being inclined in the second or third direction, perpendicular to the first direction, the fourth stoppers 440 may be preferably disposed in the symmetrical fashion described above.

The fourth stoppers 440 may appropriately limit the distance by which the bobbin 110 moves downward by contact between the lower ends of the second protrusions 441 and the first stepped portions 142 of the housing 140. Accordingly, the fourth stoppers 440 may function to inhibit the bobbin 110 from moving too far downward and keep the distance by which the bobbin 110 moves downward within the intended range.

By appropriately designing the positions of the second protrusions 441 of the fourth stoppers 440 on the bobbin 110 and the shapes of the second protrusions 441, the distance by which the bobbin 110 moves downward may be appropriately limited by the fourth stoppers 440.

Figure 5:
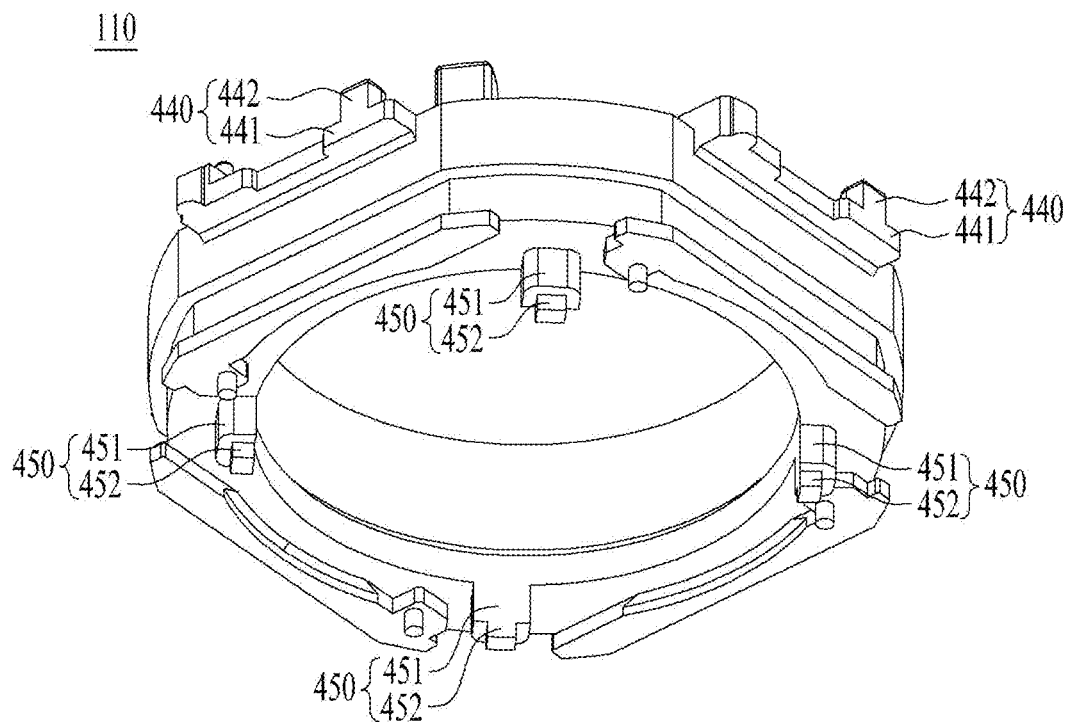
FIG. 5 is a bottom perspective view showing the bobbin according to an embodiment.
Figure 6:
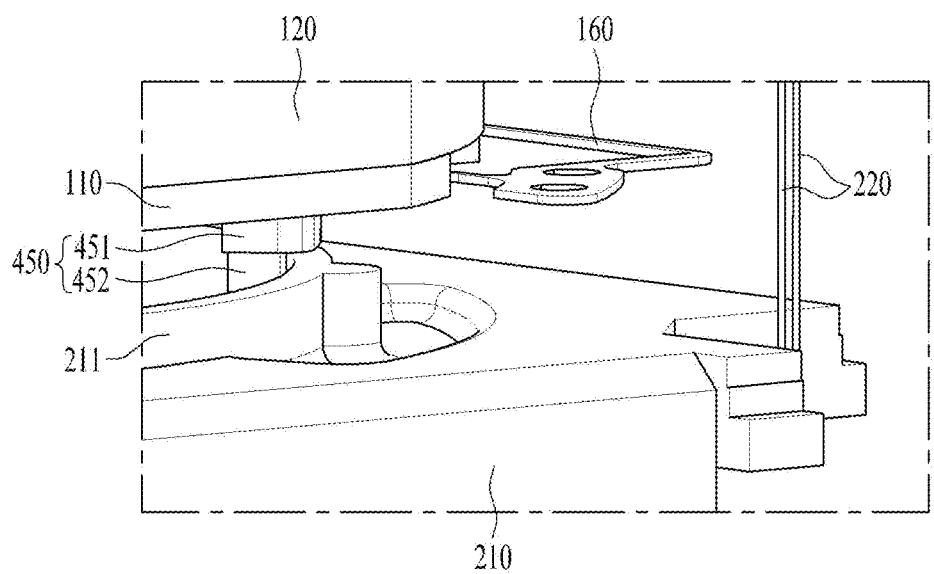
FIG. 6 is a fragmentary perspective view showing part of the lens moving apparatus according to an embodiment.

FIG. 5 is a bottom perspective view showing the bobbin 110 according to an embodiment. FIG. 6 is a fragmentary perspective view showing part of the lens moving apparatus according to an embodiment.

The lens moving apparatus according to the embodiment may include fifth stoppers 450.

As shown in FIGS. 5 and 6, the fifth stoppers 450 may be formed on the bobbin 110. Specifically, the fifth stoppers 450 may protrude downward from the lower surface of the bobbin 110 so as to function to limit the distance by which the bobbin 110 moves in the downward direction or in the second or third direction.

Each of the fifth stoppers 450 may include a fifth protrusion 451 and a sixth protrusion 452. The fifth protrusion 451 may be positioned such that a portion of the lower surface thereof faces the fourth protrusion 211, which protrudes upward from the base 210. The fifth protrusion 451 may contact the upper surface of the fourth protrusion 211 so as to limit the distance by which the bobbin 110 moves downward in the first direction.

The sixth protrusion 452 protrudes downward from the fifth protrusion 451, and a portion of the sixth protrusion 452 contacts the inner surface of the fourth protrusion 211 so as to limit the distance by which the bobbin 110 moves in the second or third direction.

The fourth protrusion 211 may protrude upward from the upper surface of the base 210. The upper surface of the fourth protrusion 211 may contact the lower surface of the fifth protrusion 451 so as to limit the distance by which the bobbin 110 moves downward. The inner surface of the fourth protrusion 211 may contact a portion of the side surface of the sixth protrusion 452 so as to limit the distance by which the bobbin 110 moves in the second or third direction.

The fourth protrusion 211 may be configured to have any shape or structure, as long as the fourth protrusion 211 can fulfill the above-described function. For example, the fourth protrusion 211 may be configured to have a closed curve shape when viewed in the first direction, or may be configured to include discontinuous protrusions which protrude from the regions corresponding to the plurality of fifth stoppers 450.

The fifth protrusion 451 may be configured to have a larger surface area than the sixth protrusion 452 when viewed in the first direction. The area of the lower surface of the fifth protrusion 451, excluding the area at which the sixth protrusion 452 protrudes downward, may contact the upper surface of the fourth protrusion 211 so as to limit the distance by which the bobbin 110 moves downward. For this reason, the fifth protrusion 451 preferably has a larger surface area than the sixth protrusion 452 when viewed in the first direction.

When the bobbin 110 moves too far downward, the lower end of the lens barrel coupled to the bobbin 110 may collide with a filter (not shown), which is disposed under the base 210, thereby breaking the filter. Accordingly, in order to inhibit breakage of the filter, there is a need to limit the distance by which the bobbin 110 moves downward. This function may be fulfilled by the fifth protrusion 451 of the fifth stopper 450.

It may be ideal in terms of handshake correction for the bobbin 110 to be fitted into the housing 140 and moves in the second or third direction together with the housing 140. However, since the bobbin 110 moves in the housing 140 in the first direction, a spacing distance w1 may be present between the outer surface of the bobbin 110 and the inner surface of the housing 140.

Owing to presence of the spacing distance w1, the bobbin 110 may move in the housing 140 in the second or third direction, thereby inhibiting the precise handshake correction function of the lens moving apparatus.

Accordingly, by virtue of above-described configuration, the sixth protrusion 452 may limit the distance by which the bobbin 110 moves in the housing 140 in the second or third direction so as to fulfill the precise handshake correction function of the lens moving apparatus.

The fifth stoppers 450 may include a plurality of stoppers, which are symmetrically disposed around the center of the bobbin 110.

When the lens moving apparatus performs the autofocusing or handshake correction function, it may be preferable for the bobbin 110 to move in the first, second or third direction and for the fifth stoppers 450 to be symmetrically disposed as described above so as to enable the bobbin 110 to move by uniform distances in the first, second and third directions.

Figure 7:
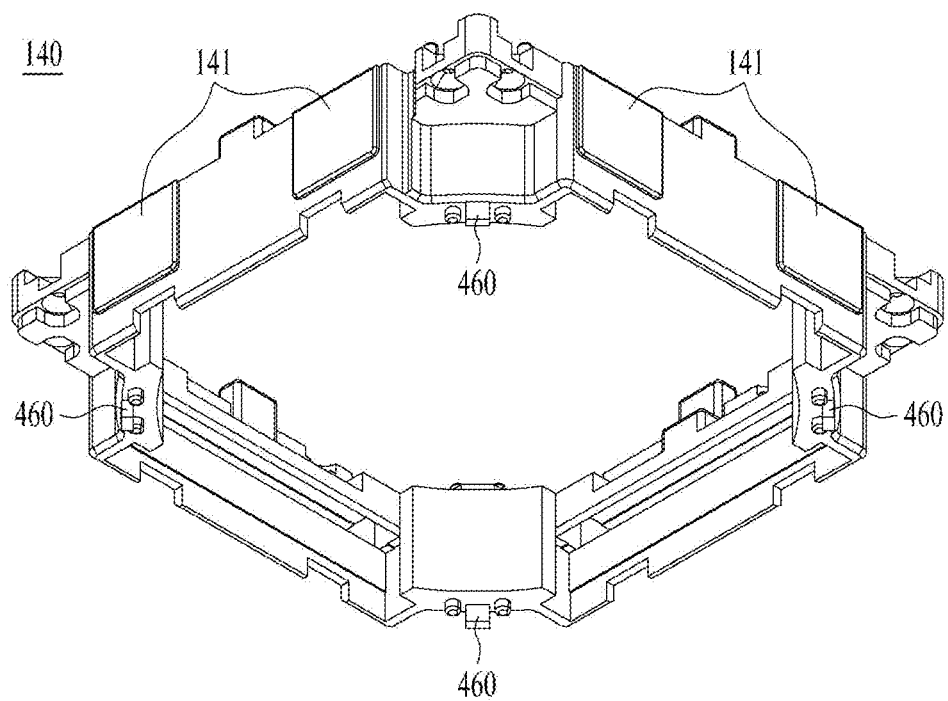
FIG. 7 is a bottom perspective view showing a housing according to an embodiment.
Figure 8:
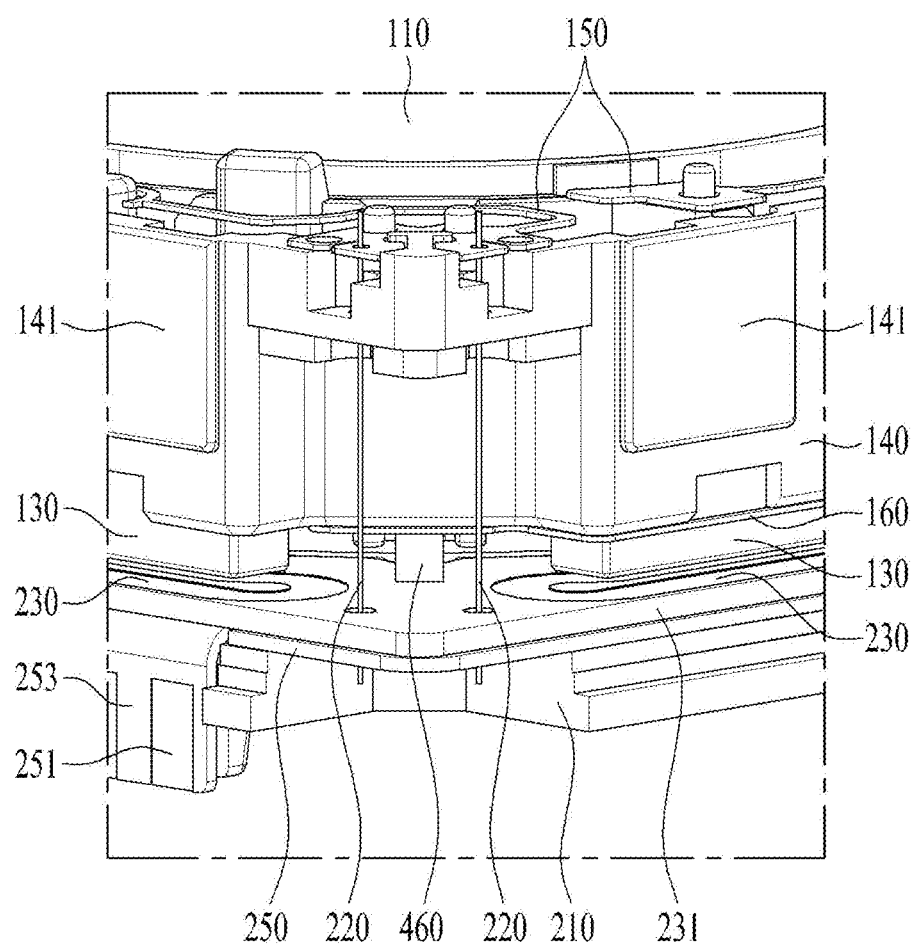
FIG. 8 is a perspective view showing part of the lens moving apparatus according to the embodiment.
Figure 9:
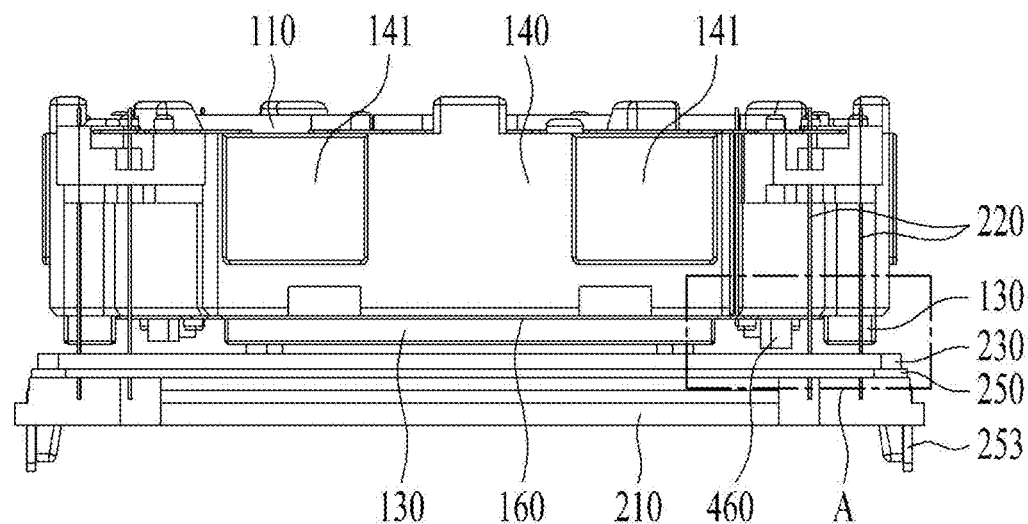
FIG. 9 is a side view showing part of the lens moving apparatus according to the embodiment.
Figure 10:
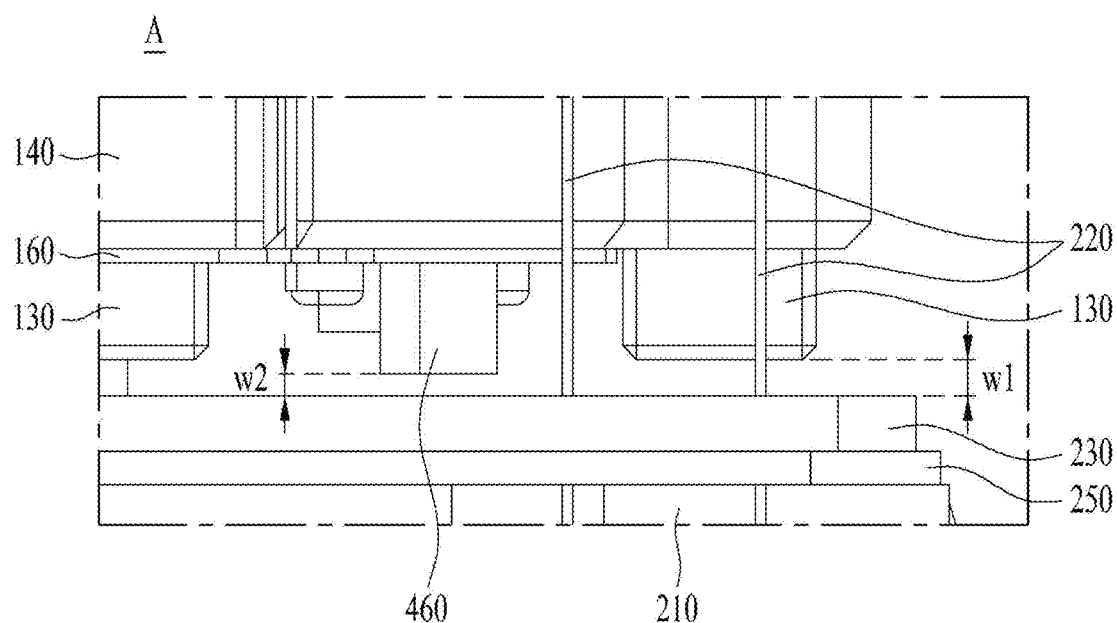
FIG. 10 is an enlarged view showing region A of FIG. 9.

FIG. 7 is a bottom perspective view showing the housing 140 according to an embodiment. FIG. 8 is a perspective view showing part of the lens moving apparatus according to the embodiment. FIG. 9 is a side view showing part of the lens moving apparatus according to the embodiment. FIG. 10 is an enlarged view showing region A of FIG. 9.

The lens moving apparatus according to the embodiment may include sixth stoppers 460. As shown in FIGS. 7 to 10, the sixth stoppers 460 may be formed on the housing 140. The sixth stoppers 460 may protrude downward from the lower surface of the housing 140.

The sixth stoppers 460 may be provided, for example, on the corners of the housing 140. The sixth stoppers 460 may include a plurality of stoppers, which are symmetrically disposed around the center of the housing 140.

In order to limit the distance by which the housing 140 can move downward while keeping the housing 140 in the state of not being inclined in the second or third direction, perpendicular to the first direction, the sixth stoppers 460 may be preferably disposed in the symmetrical fashion described above.

When the sixth stoppers 460 are disposed on the corners of the housing 140, the lower surfaces of the sixth stoppers 460 may contact the area of the circuit member 231 at which the second coils 230 are not formed so as to inhibit the second coils 230 from being broken due to collision between the sixth stoppers 460 and the second coils 230.

As described above, unlike the bobbin 110, the housing 140 may not actively move upward and downward in the first direction. However, since the lower ends of the first magnets 130 and the upper end of the second coils 230 are positioned to face each other with a spacing distance w1 therebetween, as shown in FIG. 10, when the support members 220 are warped due to external impact, the spacing distance w1 defines a space, thereby allowing the housing 140 to move downward in the first direction.

When the lens moving apparatus performs the handshake correction function, the housing 140 may be inclined in the second or third direction, whereby the housing 140 may move downward in the first direction.

As the housing 140 moves downward, the support members 220 may be extended in the length direction by being subjected to tensile force or bending moment. When excessive downward movement of the housing 140 is repeated, the support members 220 are extended so far that deformation of the support members 220 exceeds the elastic limit, whereby the support members 220 may be damaged, even breaking in severe cases.

Accordingly, the sixth stoppers 460 may limit the distance by which the housing 140 moves upward in order to inhibit damage, breakage or the like of the support members 220.

When the housing 140 excessively moves downward, the bobbin 110 fitted in the housing may also move downward. When the bobbin 110 moves too far downward, the lower end of the lens barrel, which is coupled to the bobbin 110 may collide with a filter, which may be disposed under the base 210, thereby breaking the filter.

Accordingly, in order to inhibit breakage of the filter, there is a need to limit the distance by which the housing 140 and the bobbin 110 move downward. This function may be fulfilled by both the fifth stoppers 450 and the sixth stoppers 460.

The sixth stoppers 460 may serve to inhibit the lower surfaces of the first magnets 130 from contacting the upper surfaces of the second coils 230. As shown in FIGS. 8 to 10, in the lens moving apparatus according to the embodiment, the lower ends of the first magnets 130 may be disposed to face the second coils 230.

Accordingly, when the housing 140 moves too far downward, the first magnets 130 may directly collide with the second coils 230, thereby damaging or breaking the second coils 230. For this reason, the sixth stoppers 460 may limit the distance by which the housing 140 moves downward such that the first magnets 130 do not directly contact the second coils 230. As a result, it is possible to inhibit damage or breakage of the second coils 230 caused by the impact of the first magnets 130.

To this end, the lower surfaces of the first magnets 130 and the upper surfaces of the second coils 230 are disposed to be spaced apart from each other, and the lower ends of the sixth stoppers 460 may be positioned lower than the lower surfaces of the first magnets 130 in the first direction.

Specifically, it is preferable that the spacing distance w1 between the lower surfaces of the first magnets 130 and the upper surfaces of the second coils 230 be longer than the second distance w2, which is measured from the upper surfaces of the second coils 230 to the lower ends of the sixth stoppers 460 in the first direction.

In other words, since the second distance w2 is designed to be smaller than the spacing distance w1, even when the housing 140 moves downward, the lower ends of the sixth stoppers 460 first contact the upper surfaces of the second coils 230, thereby inhibiting the lower ends of the first magnets 130 from directly contacting the second coils 230 and inhibiting the impact from being applied to the second coils 230.

In the lens moving apparatus according to the embodiment, the spacing distance w1 may be set to be within a range of 0.04 mm to 0.26 mm in the normal state in which the support members 220 are not deformed by bending, stretching or compression. More preferably, the spacing distance w1 may be set to be within a range of 0.08 mm to 0.13 mm.

The first to sixth stoppers, which have been described in the above embodiment, may be independently provided in the lens moving apparatus. In other words, the lens moving apparatus according to the embodiment may include one or more of the first to sixth stoppers.

In the embodiment, the respective stoppers, which are provided in the lens moving apparatus, have effects of being able to inhibit damage or breakage of the support members 220 due to deformation thereof and being able to inhibit damage or breakage of the second coils 230 due to impact.

Furthermore, when mechanical resonance is generated by the support members 220, some of the stoppers have an effect of making it possible to easily control resonance frequency.

In addition, some of the stoppers have an effect of being able to inhibit breakage of the filter, provided under the base 210, due to impact.

The lens moving apparatus according to the embodiment may be incorporated in devices in various fields, for example, a camera module. Such a camera module may be applied to mobile devices such as cellular phones.

The camera module according to the embodiment may include the lens barrel coupled to the bobbin 110, an image sensor (not shown), a printed circuit board, and an optical system.

The lens barrel may be constructed as described above, and the printed circuit board may constitute the bottom surface of the camera module on which the image sensor is mounted.

The optical system may include at least one lens for transmitting images to the image sensor. The optical system may be provided with an actuator module capable of fulfilling autofocusing and handshake correction functions. The actuator module for fulfilling the autofocusing function may be constructed in various fashions, and mainly adopts a voice coil unit motor. The lens moving apparatus according to the above-described embodiment may serve as an actuator module for fulfilling both autofocusing and handshake correction functions.

Although not shown in the drawings, the camera module may further include an infrared-screening filter. The infrared-screening filter serves to shield the image sensor from light in an infrared range. The base 210 shown in FIG. 2 may include the infrared-screening filter mounted at a position corresponding to the image sensor, and may be coupled to a holder member (not shown). The base 210 may support the lower portion of the holder member.

The base 210 may be provided with an additional terminal member for connection with the printed circuit board 250, and the terminal member may also be integrally formed using a surface electrode. The base 210 may serve as a sensor holder for protecting the image sensor. In this case, although the base 210 may be provided along the lateral side surface thereof with protrusions that project downward, these are not essential components. Although not shown in the drawings, an additional sensor holder disposed under the base 210 may fulfill the same function as the protrusions.

Figure 11:
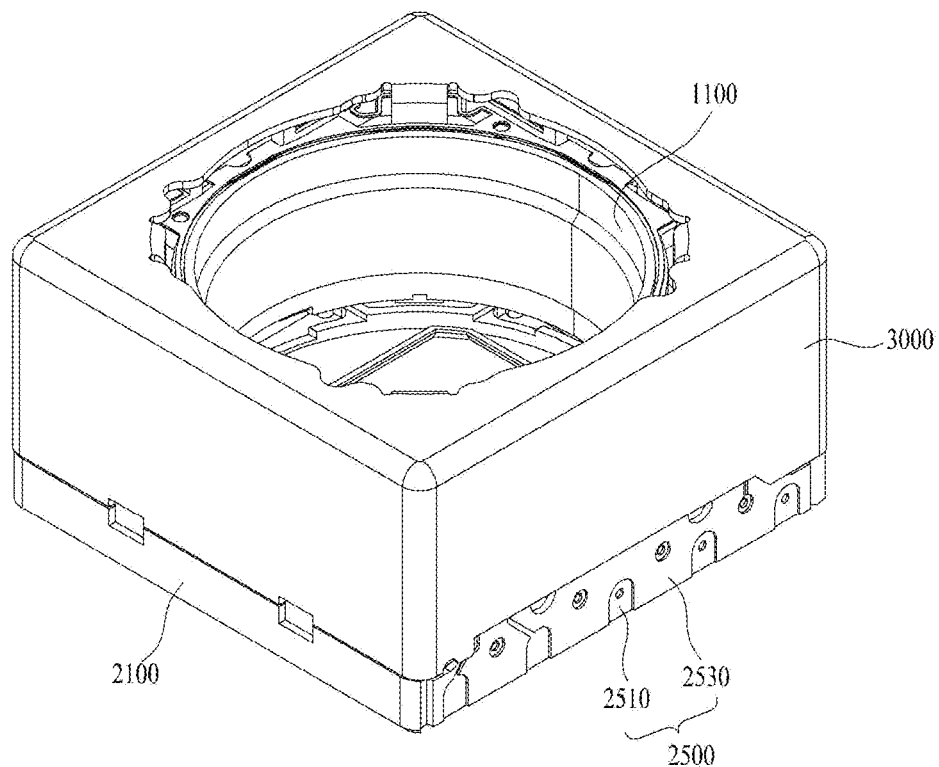
FIG. 11 is a perspective view schematically showing the lens moving apparatus according to another embodiment.
Figure 12:
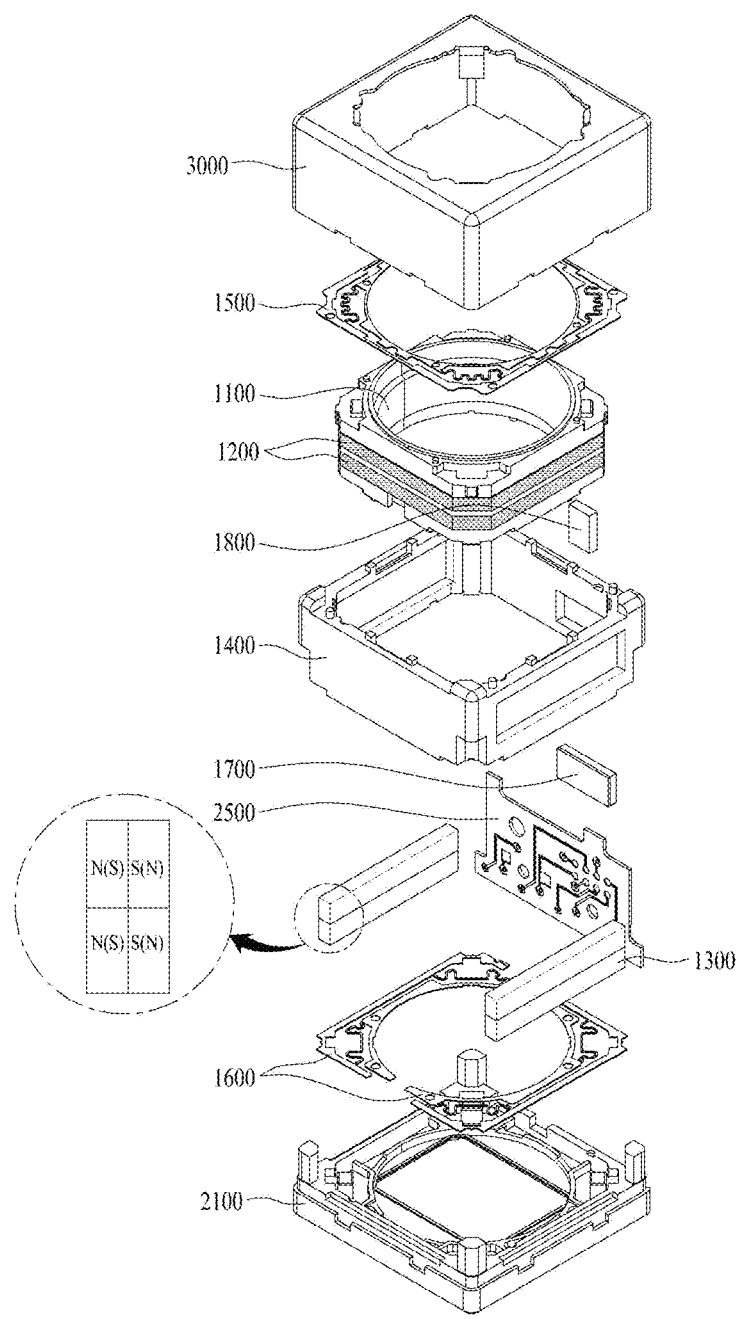
FIG. 12 is an exploded perspective view showing the lens moving apparatus according to the embodiment.

FIG. 11 is a perspective view schematically showing the lens moving apparatus according to another embodiment. FIG. 12 is an exploded perspective view showing the lens moving apparatus according to the embodiment.

As shown in FIG. 12, the lens moving apparatus according to the embodiment may include a movable unit. The movable unit may fulfill the autofocusing function of the lens. The movable unit may include a bobbin 1100, a first coil 1200, first magnets 1300, a housing 1400, an upper elastic member 1500, a lower elastic member 1600, a position detection sensor 1700 and a second magnet 1800.

The bobbin 1100 may be provided on the outer surface thereof with the first coil 1200 disposed between the first magnets 1300. By electromagnetic interaction between the first magnets 1300 and the first coil 1200, the bobbin 1100 may reciprocate in the first direction in the space inside the housing 1400.

The bobbin 1100 may be provided on the outer surface thereof with the first coil 1200 so as to electromagnetically interact with the first magnets 1300.

As shown in FIG. 12, according to the embodiment, the first coil 1200 includes two coils, which are wound around two areas on the outer surface of the bobbin 1100. In other words, the first coil 1200 may include a plurality of coils, which are wound around a plurality of areas of the outer surface of the bobbin 1100, whereby the first coils, wound around the plurality of areas, are spaced apart from each other in the first direction.

Each of the first magnets 1300, which are disposed to correspond to the first coil 1200, may include a plurality of magnets in which the N pole and the S pole are disposed side by side, both in the first direction and in the direction perpendicular to the first direction.

Although not shown in the drawings, each of the first magnets 1300 may be configured such that the N pole and the S pole are disposed side by side, only in the first direction, or in a direction perpendicular to the first direction.

The bobbin 1100 may move in the first direction in the state of being elastically supported by the upper elastic member 1500 and the lower elastic member 1600 in order to fulfill the autofocusing function.

The housing 1400 may be configured to have an approximately rectangular hollow column shape for supporting the first magnets 1300. The first magnets 1300 may be coupled to the housing 1400. As described above, the bobbin 1100 may be disposed on the inner surface of the housing 1400, and may be supported by the housing 1400 in the state of being capable of moving in the first direction.

The housing 1400 may have four side flat walls. The surface area of each of the side walls of the housing 1400 may be equal to or greater than that of each of the first magnets 1300. Among the four side walls, two side walls that face each other may be provided with respective magnet fitting holes or recesses into which the first magnets 1300 are fitted.

As shown in FIG. 12, each of the side walls of the housing 1400 may be provided with two first magnets 1300, which are arranged vertically. Accordingly, the magnet fitting holes or recesses in the housing 1400 may be provided in a number corresponding to the number of first magnets 1300.

The pair of first magnets 1300 may be disposed so as to be symmetrical to the center of the housing 1400.

If the first magnets 1300 are asymmetrically disposed with respect to the center of the housing 1400 so as to face each other and are deflected to one side of the housing 140, electromagnetic force is not correctly applied to the coil 1200 of the bobbin 1100, but is applied toward the one side, whereby the bobbin 1100 may be tilted.

Accordingly, the pair of first magnets 1300 is preferably disposed so as to be symmetrical around the center of the housing 1400.

One of the two remaining side walls of the housing 1400, other than the two side walls containing the first magnets 1300, may be provided with a sensor through hole into which the position detection sensor 1700, which is to be described later, is fitted.

Accordingly, among the four side walls of the housing 1400, two side walls that face each other may be provided with respective first magnets 1300, and one of the two remaining side walls, other than the two side walls containing the first magnets 1300, may be provided with the position detection sensor 1700.

The upper elastic member 1500 and the lower elastic member 1600 may be coupled to the bobbin 1100 and the housing 1400, respectively, and may be disposed on the bobbin 1100 and under the housing 1400, respectively.

The upper elastic member 1500 and the lower elastic member 1600 may elastically support the upward and/or downward movement of the bobbin 1100 in the first direction. The upper elastic member 1500 and the lower elastic member 1600 may be constituted by leaf springs.

As shown in FIG. 12, the lower elastic member 1600 may be composed of two separated elastic member parts. By virtue of the separated structure of the lower elastic member 1600, current of different polarities or different electric powers may be applied to the respective elastic member parts of the lower elastic member 1600.

In a modification, the upper elastic member 1500 may be composed of two separated elastic member parts whereas the lower elastic member 1600 may be integrally constructed.

The upper elastic member 1500, the lower elastic member 1600, the bobbin 1100 and the housing 1400 may be assembled with one another through a bonding process using thermal fusion and/or an adhesive. Here, the assembly may be implemented through bonding using an adhesive after thermal fusion.

The position detection sensor 1700 may constitute a displacement detection unit for determining the displacement values of the bobbin 1100 in the first direction, in conjunction with the second magnet 1800, described later. To this end, the position detection sensor 1700 and the sensor fitting through hole may be disposed at a position corresponding to the position of the second magnet 1800.

The second magnet 1800 may be coupled to the bobbin 1100. Accordingly, when the bobbin 1100 moves in the first direction, the second magnet 1800 may be displaced the same distance as the bobbin 1100.

The second magnet 1800 may be integrally constructed, and may be disposed such that the N pole thereof is positioned at an upper part of the bobbin 1100 and the S pole thereof is positioned at a lower part of the bobbin 1100. However, the disposition of the second magnet 1100 is not limited thereto, and the opposite disposition of the N and S poles is also possible.

The second magnet 1800 may be constituted by a single magnet, or by two or more magnets which are integrally coupled to each other. The specific structure of the second magnet 1800 will be described later with reference to FIGS. 14B and 14C.

The second magnet 1800 may be divided into two sections with respect to the plane perpendicular to the optical axis. The second magnet 1800 may be spaced apart from the position detection sensor 1700 by a predetermined distance in a direction perpendicular to the first direction.

The base 2100 may be disposed under the bobbin 1100, and may be configured to have an approximately rectangular shape. The printed circuit board 2500 and the lower elastic member 1600 may be mounted on the base 2100.

The cover member 3000 may be coupled to the upper portion of the base 2100. Specifically, the base 2100 and the cover member 3000 may be sealingly secured to each other by an adhesive or the like applied to mating ends thereof that contact each other.

The printed circuit board 2500 may be coupled to one side surface of the housing 1400. The printed circuit board 2500 may be provided with a terminal member 2530.

The terminal member 2530 may be provided with a plurality of terminals 2510 in order to receive external power and supply the current to the coil 1200 of the bobbin 1100 and the position detection sensor 1700. The number of terminals 251 provided on the printed circuit board 2500 may be increased or decreased depending on the kinds of components to be controlled. According to the embodiment, the printed circuit board 2500 may be embodied as a flexible printed circuit board (FPCB).

The printed circuit board 2500 may include a controller, which further controls the amount of current applied to the coil 1200 based on the displacement value detected by the displacement detection unit.

In other words, the controller may be mounted on the printed circuit board 2500. In another embodiment, the controller may not be mounted on the printed circuit board 2500, but may be mounted on another board. The additional board may be a board on which the image sensor of the camera module is mounted, or may be another additional board.

The cover member 3000 may be configured to have an approximately rectangular box shape. The cover member 3000 may accommodate the movable unit, a portion of the printed circuit board 2500 and the like, and may be coupled to the base 2100.

The cover member 3000 may protect the movable unit, the printed circuit board 2500 and the like, accommodated therein, and may particularly inhibit the electromagnetic field, generated by the first magnets 1300, the first coil 1200 and the like, accommodated therein, from leaking to the outside, thereby focusing the electromagnetic field.

Figure 13:
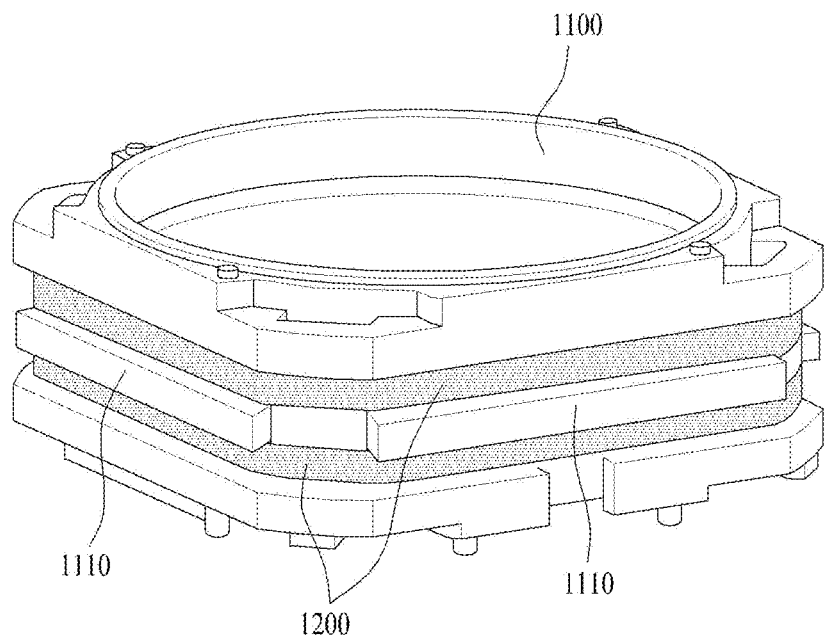
FIG. 13 is a perspective view showing the lens moving apparatus according to an embodiment, in which the coil is coupled to the bobbin.

FIG. 13 is a perspective view showing the lens moving apparatus according to an embodiment, in which the coil 1200 is coupled to the bobbin 1100. As shown in FIG. 13, in the embodiment, the coil 1200 may includes a plurality of coils, which are wound around the outer surface of the bobbin 1100 and are spaced apart from each other in the first direction. FIG. 13 shows an embodiment in which the coil 1200 includes two coils, which are wound around two parts of the outer surface of the bobbin 1100, which are spaced apart from each other in the first direction.

In order to maintain the spacing between each of the plurality of coils 1200 at a constant value and keep the coils 1200 wound around the outer surface of the bobbin 1100 in a stable state, the bobbin 1100 may be provided on the outer surface thereof with a spacer 1110.

As shown in FIG. 13, the spacer 1110 may be circumferentially formed around the middle area of the outer surface of the bobbin 1100, and may be configured to have a constant width when measured in the first direction. The width of the spacer 1110 in the first direction may be the spacing between the plurality of coils 1200 in the first direction.

The spacer 1110 may be circumferentially formed around the outer surface of the bobbin 1100, and may be integrally formed so as to protrude outward from the bobbin 1100. As described above, the spacer 1110 may serve to space the plurality of coils 1200 apart from each other at a constant spacing in the first direction.

As shown in FIG. 12, since the coils 1200 include a plurality of coils disposed on a plurality of areas of the outer surface of the bobbin 1100, each of the first magnets 1300, which correspond to the coils 1200, may be constituted by a plurality of magnets, or may be constituted by a single magnet which is magnetized at a plurality of sections so as to correspond to the plurality of coils 1200.

The plurality of coils 1200 may be wound around the outer surface of the bobbin 1100 in opposite directions. In order to increase the magnetic force of the first magnets 1300, the first magnets 1300, which are provided so as to face respective coils 1200, are preferably disposed such that unlike poles are allocated to the opposite surfaces of adjacent first magnets that face each other in the first direction.

The reason for this is because there is a need to make the directions in which current flows through the plurality of coils 1200 different in order to cause the directions of forces generated by the coils 1200 and the first magnets 1300 to be the same, in accordance with Fleming's left-hand rule.

To this end, for example, the upper coil of the plurality of coils 1200 may be wound clockwise around the outer surface of the bobbin 1100 when viewed in the first direction, whereas the lower coil may be wound counterclockwise around the outer surface of the bobbin 1100 when viewed in the first direction.

In contrast, the upper coil of the plurality of coils 1200 may be wound counterclockwise and the lower coil may be wound clockwise around the outer surface of the bobbin 1100 when viewed in the first direction.

Figure 14A:
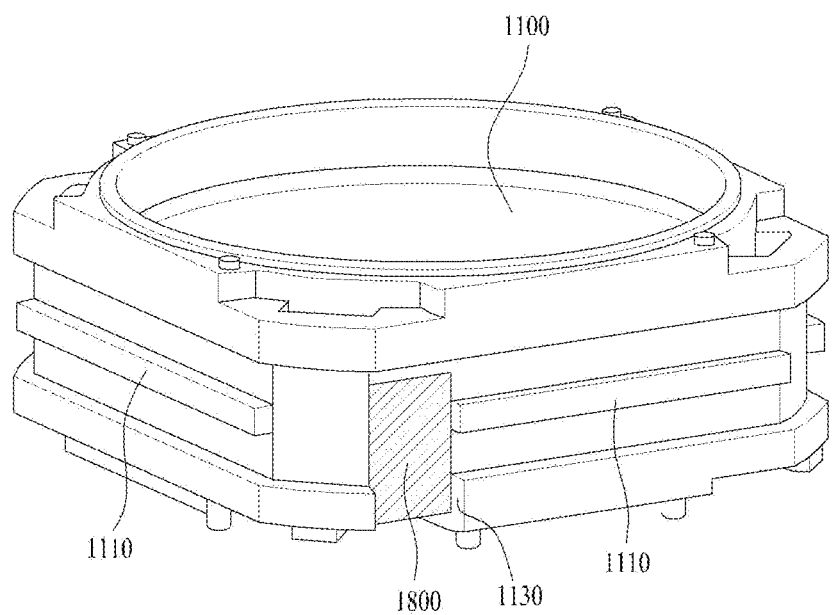
FIG. 14A is a perspective view showing the lens moving apparatus according to an embodiment, in which the second magnet is coupled to the bobbin.

FIG. 14A is a perspective view showing the lens moving apparatus according to an embodiment, in which the second magnet 1800 is coupled to the bobbin 1100.

As described above, the second magnet 1800 and the position detection sensor 1700, which is disposed to face the second magnet 1800, may collectively constitute the displacement detection unit for detecting the displacement value of the bobbin 1100 in the first direction.

In the embodiment, the second magnet 1800 may be provided at the bobbin 1100. To this end, the bobbin 1100 may be provided on a side surface thereof with a magnet mount 1130, on which the second magnet 1800 is securely mounted.

As shown in FIG. 14A, the magnet mount 1130 may be configured to have a size and shape such that the second magnet 1800 is securely mounted on the side surface of the bobbin 1100. For example, the magnet mount 1130 may be configured to have a recessed shape, which is formed in a portion of the side surface of the bobbin 1100.

The second magnet 1800 may be mounted on the magnet mount 1130, and may then be secured to the bobbin by means of an adhesive or the like. Owing to the presence of the magnet mount 1130, the spacer 1110 is cut and interrupted at the area at which the magnet mount 1130 is formed.

Accordingly, even when the coils 1200 are wound around the outer surface of the bobbin 1100, the second magnet 1800 may have a non-coil area, which is positioned at the interrupted area of the spacer 1110 and has a size corresponding to the spacing between the plurality of coils 1200.

As a result, the magnet 1800 secured to the bobbin 1100 may be disposed at the side surface of the bobbin 1100 that is opposite the position detection sensor 1700 so as to directly face the position detection sensor 1700 through the non-coil area. Furthermore, the second magnet 1800 may be disposed to face the detecting portion of the position detection sensor 1700.

As described above, by providing the non-coil area between the second magnet 1800 and the position detection sensor 1700, at which the coil 1200 is not present, the second magnet 1800 may directly face the position detection sensor 1700 without interference with the coils 1200. Consequently, it is possible to reduce detection error by the position detection sensor 1700, which is caused by interference with current flowing through the coils 1200.

Figure 14B:
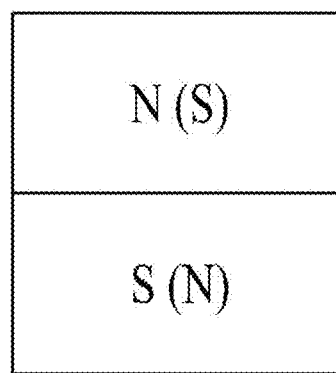
FIG. 14B is front view showing the magnetized structure of the second magnet according to an embodiment.
Figure 14C:
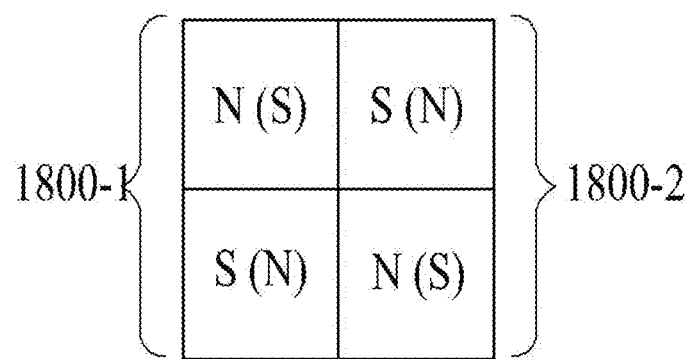
FIG. 14C is a front view showing the magnetized structure of the second magnet according to another embodiment.

FIG. 14B is front view showing the magnetized structure of the second magnet 1800 according to an embodiment. FIG. 14C is a front view showing the magnetized structure of the second magnet 1800 according to another embodiment.

As shown in FIG. 14B, the second magnet 1800 according to an embodiment may be constituted by a single magnet, and may be disposed such that the N pole and the S pole are arranged in the first direction.

In this case, the second magnet 1800 may be disposed such that the N pole is positioned higher than the S pole or such that the S pole is positioned higher than the N pole.

As shown in FIG. 14C, the second magnet 1800 may be constituted by two second magnets 1800-1 and 1800-2, each of which is configured as shown in FIG. 14B and which are integrally coupled to each other such that four magnetic poles, that is, two N poles and two S poles, are provided, and such that the N pole and the S pole of each magnet are arranged in the first direction.

The second magnets 1800-1 and 1800-2 may be disposed in such a fashion that the poles that are adjacent to each other in the first direction, are different from each other.

Specifically, in the second magnet 1800-1, which is positioned on the right side in the drawing, the N pole is positioned higher than the S pole. In the second magnet 1800-2, which is positioned on the left side in the drawing, the S pole is positioned higher than the N pole.

In contrast, in the second magnet 1800-1, which is positioned on the right side in the drawing, the S pole is positioned higher than the N pole. In the second magnet 1800-2, which is positioned on the left side in the drawing, the N pole is positioned higher than the S pole.

Figure 15:
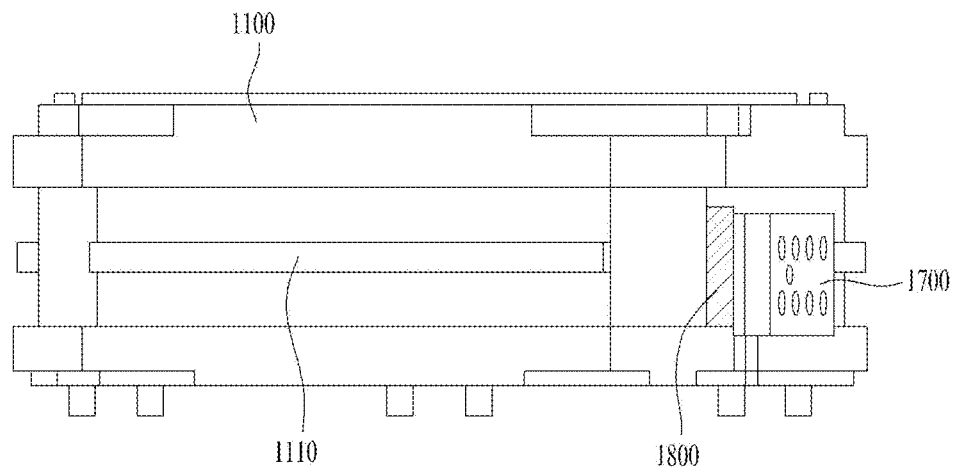
FIG. 15 is a side view showing the disposition of the bobbin, the position detection sensor and the second magnet in the lens moving apparatus according to an embodiment.

FIG. 15 is a side view showing the disposition of the bobbin 1100, the position detection sensor 1700 and the second magnet 1800 in the lens moving apparatus according to an embodiment.

The second magnet 1800 is mounted on the side surface of the bobbin 1100, and the position detection sensor 1700 is mounted on the housing 1400 so as to face the second magnet 1800.

As the bobbin 1100 moves in the first direction, the second magnet 1800 moves in the first direction together with the bobbin 1100, and the position detection sensor 1700, mounted on the housing 1400, may detect displacement values of the second magnet 1800 and the bobbin 1100 in the first direction by detecting variation in magnetic force generated by movement of the second magnet 1800 in the first direction.

Since the coil 1200 is disposed between the second magnet 1800 and the position detection sensor 1700, opposite surfaces of the second magnet 1800 and the position detection sensor 1700 that face each other may be spaced apart from each other by a predetermined distance in a direction perpendicular to the first direction.

Figure 16:
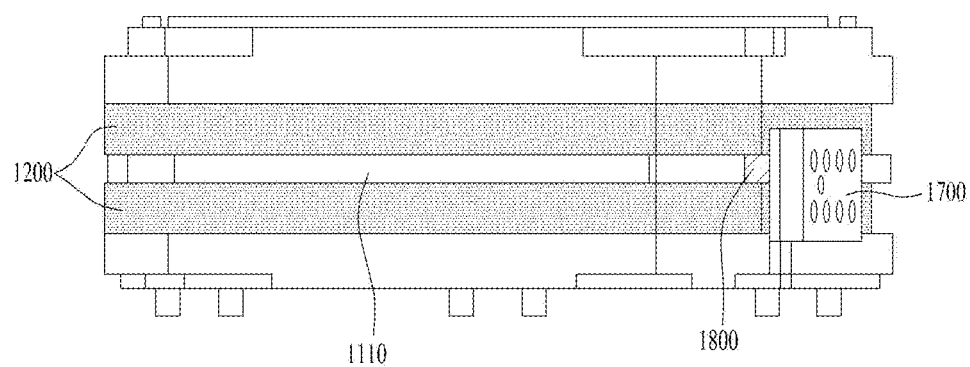
FIG. 16 is a side view showing the disposition of the bobbin, the position detection sensor, the second magnet and the coils in the lens moving apparatus according to the embodiment.

FIG. 16 is a side view showing the disposition of the bobbin 1100, the position detection sensor 1700, the second magnet 1800 and the coils 1200 in the lens moving apparatus according to the embodiment.

As described above, the coil 1200 includes a plurality of coils wound around a plurality of areas on the outer surface of the bobbin 1100 so as to provide an upper coil 1200 and a lower coil 1200. The upper coil 1200 and the lower coil 1200 are disposed so as to have a predetermined spacing in the first direction by means of the spacer 1110. The upper coil 1200 and the lower coil 1200 may be wound in opposite directions.

The position detection sensor 1700 may be disposed such that at least a portion of the surface of the position detection sensor 1700, which faces the second magnet 1800, is positioned at the gap between the plurality of coils 1200 so as to directly face the second magnet 1800.

In other words, although the coil 1200 is wound around the outer surface of the bobbin 1100, the second magnet 1800 may have a non-coil volume, in which the coil 1200 is not present, that is, the space obtained by the spacing between the upper coil 1200 and the lower coil 1200, multiplied by the thickness of the second magnet 1800 in the direction perpendicular to the first direction.

Accordingly, by providing the non-coil area, in which the coils 1200 are not present, between the second magnet 1800 and the position detection sensor 1700, the second magnet 1800 may directly face the position detection sensor 1700 without interference with the coils 1200.

If the coils 1200 are disposed between the second magnet 1800 and the position detection sensor 1700, an interference phenomenon, in which the current through the coils 1200 distorts the structure or intensity of the magnetic field generated by the second magnet 1800, may occur.

Due to the interference phenomenon, when the second magnet 1800 moves in the first direction, the position detection sensor 1700 detects a magnetic field that is distorted by the current flowing through the coils 1200, rather than the correct magnetic field generated by the second magnet 1800.

For this reason, detection error occurs at the position detection sensor 1700, and thus the position detection sensor 1700 is not able to precisely detect the displacement value of the second magnet 1800 in the first direction.

According to the embodiment, by providing the non-coil area between the second magnet 1800 and the position detection sensor 1700 as described above, it is possible to mitigate the interference phenomenon caused by current flowing through the coils 1200.

Consequently, it is possible to remarkably reduce the detection error of the position detection sensor 1700 in detecting the displacement value of the second magnet 1800 in the first direction due to the interference phenomenon.

Figure 17:
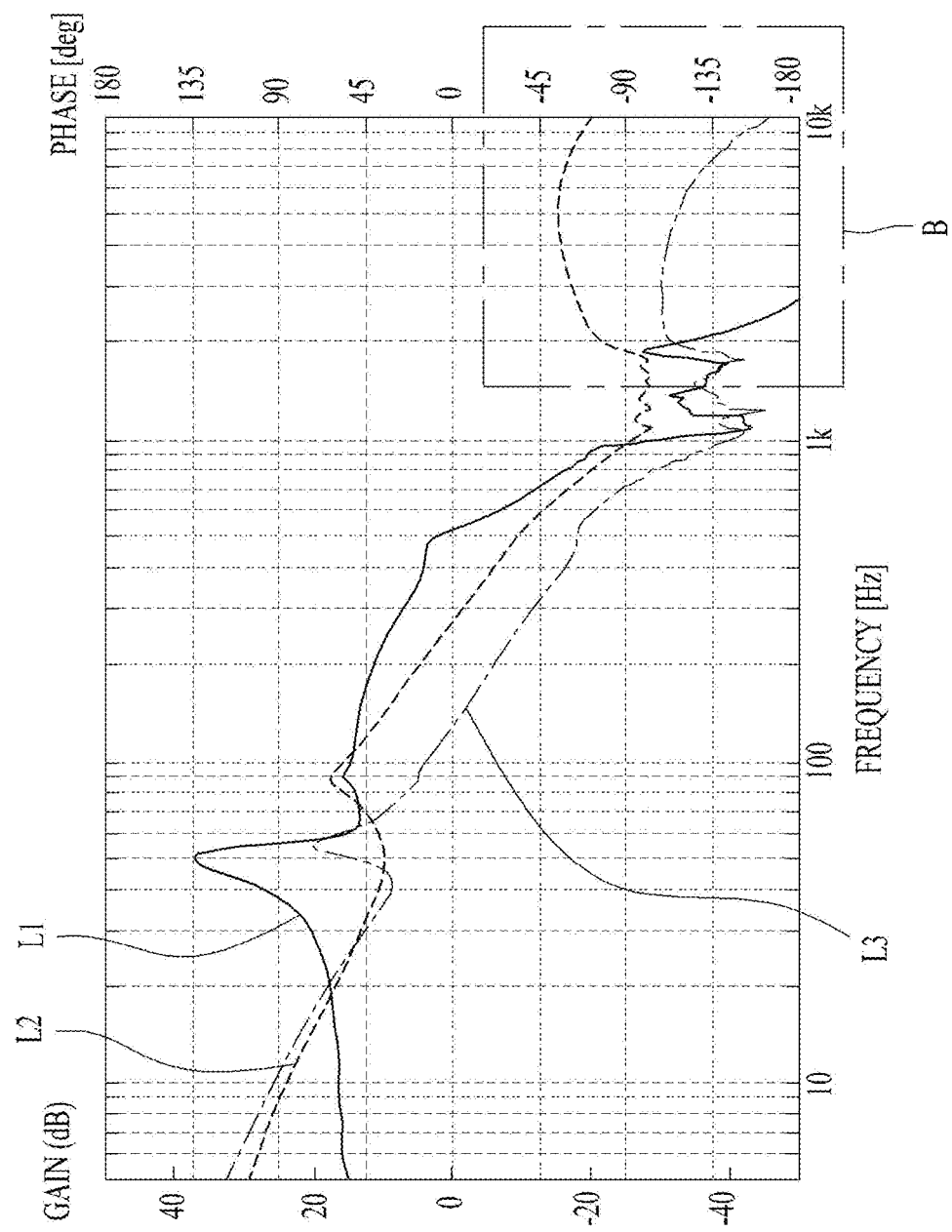
FIG. 17 is a graph representing the results of experimentation on the drive characteristics of the lens moving apparatus according to an embodiment.

FIG. 17 is a graph representing the results of experimentation on the drive characteristics of the lens moving apparatus according to an embodiment. In the graph, GAIN may be converted into a displacement value of the second magnet

1800 in the first direction through appropriate conversion from the value detected by the position detection sensor 1700.

In the graph, the gain of the lens moving apparatus according to the embodiment, which is provided with the non-coil area, is denoted by L1, and the gain of a lens moving apparatus that is not provided with the non-coil area because only one coil 1200 is wound around the outer surface of the bobbin 1100, is denoted by L2.

In the graph, PHASE may be represented by the phase difference between a current input value of the coil 1200 and a current output value of the position detection sensor 1700, and the phase is denoted by L3.

Since the displacement value of the second magnet 1800 in the first direction and the displacement value of the bobbin 1100 in the first direction are identical to each other, detection error by the position detection sensor 1700 may decrease further as L1 or L2 becomes approaches with L3.

From area B in the graph, it is noted that L3 is continuously lowered as the frequency is increased. However, it is also noted that curve L1 or L2 has a rising section in the B area.

Comparing curve L1 with curve L2 in the area B, as the frequency is increased, the gain of curve L1 is increased to a large extent compared to curve L3, and the rate of increase of curve L1 is constant.

Although the gain of L2 is increased more than that of curve L3 with an increase in frequency, the rate of increase of curve L2 is notably lower than that of curve L1. When the frequency is further increased after the increase of the gain, the gain is decreased.

Comparing curve L1 with curve L2, the pattern of variation of curve L2 is more similar to that of curve L3 than to that of L1. This shows that the detection error by the position detection sensor 1700, attributable to current flowing through the coil 1200 in the lens moving apparatus equipped with the non-coil area, is less than in a lens moving apparatus not equipped with the non-coil area.

The error in the detection of the displacement value by the position detection sensor 1700 in the first direction of the lens moving apparatus according to the embodiment, which is caused by the difference between the gain and the phase representing the current input value of the coils 1200, may be dramatically reduced or eliminated through calibration.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A lens moving apparatus, comprising:
a bobbin adapted to move upward and downward in a first direction;
a housing in which the bobbin is accommodated so that the bobbin is movable upward and downward in the first direction in relation to the housing;
a cover member accommodating the bobbin and the housing; and
a base to which a lower portion of the cover member is coupled,
wherein the bobbin includes a fourth stopper protruding from an outer surface thereof,
wherein the cover member has an opening formed in an upper surface thereof,
wherein a first stopper is formed to protrude downwards toward the bobbin from an inner surface of the upper surface of the cover member around the opening, a distance by which the bobbin moves upward being limited by contacting between a lower end of the first stopper and an upper end of the bobbin, and
wherein the fourth stopper comprises:
a second protrusion, which is disposed such that a lower surface thereof faces a first stepped portion, which is formed on the housing so as to limit a distance by which the bobbin moves downward; and
a third protrusion, which protrudes upward from the second protrusion and partially faces an inner surface of the housing so as to guide movement of the bobbin in the first direction together with the housing.

2. The lens moving apparatus according to claim 1, wherein the fourth stopper includes a plurality of stoppers, the plurality of stoppers being symmetrically disposed around a center of the bobbin.

3. The lens moving apparatus according to claim 1, wherein the first stopper is formed at an upper wall of the cover member to surround the opening,
wherein the first stopper protrudes downward from the upper wall of the cover member,
wherein a second stopper for limiting a distance by which the housing moves upward is formed at an outer portion of the upper wall of the cover member,
wherein the second stopper protrudes downward from the upper wall of the cover member and is separated from the first stopper,
wherein the first stopper and the second stopper face the bobbin and the housing, respectively,
wherein the first stopper and the second stopper are disposed on the upper wall of the cover member, and a third stopper is disposed on a side wall of the cover member,
wherein the third stopper limits a distance by which the housing moves in a second or third direction.

4. A lens moving apparatus, comprising:
a housing;
a bobbin adapted to move upward and downward in a first direction in the housing;
a cover member accommodating the bobbin and the housing; and
a base to which a lower portion of the cover member is coupled,
wherein the bobbin includes a fifth stopper, which protrudes downward from a lower portion of the bobbin to limit a distance by which the bobbin moves in a second direction in a third direction, or downward in the first direction,
wherein the base includes a stepped portion, and
wherein the fifth stopper comprises:
a sixth protrusion, which protrudes downward from the lower portion of the bobbin and faces an inner surface of the stepped portion of the base to limit a distance by which the bobbin moves in the second or third direction.

5. The lens moving apparatus according to claim 4, wherein a lower surface of the sixth protrusion contacts an upper surface of the stepped portion.

6. The lens moving apparatus according to claim 4, wherein an outer surface of the sixth protrusion faces an inner surface of the stepped portion.

* * * * *